US006758235B2

United States Patent
Frohwein et al.

(10) Patent No.: US 6,758,235 B2
(45) Date of Patent: Jul. 6, 2004

(54) VAPOR CONTROL VALVE WITH A METALLIC SEALING ELEMENT

(75) Inventors: Axel Frohwein, Treuchtlingen (DE); Lydie Regnier, Pappenheim (DE)

(73) Assignee: Alfmeier Prazision AG Baugruppen und Systemlosungen, Treuchtlingen (DE)

( * ) Notice: Subject to any disclaimer, the term of this patent is extended or adjusted under 35 U.S.C. 154(b) by 0 days.

(21) Appl. No.: 10/260,722

(22) Filed: Sep. 30, 2002

(65) Prior Publication Data

US 2004/0060596 A1 Apr. 1, 2004

(51) Int. Cl.$^7$ .............................................. F16K 24/04
(52) U.S. Cl. ........................................ 137/202; 137/43
(58) Field of Search ................................. 137/43, 202

(56) References Cited

U.S. PATENT DOCUMENTS

| 2,990,842 A | * | 7/1961 | Good ........................... 137/202 |
| 3,614,960 A | * | 10/1971 | Pfrengle ....................... 137/202 |
| 4,679,580 A | | 7/1987 | Devall et al. |
| 4,815,705 A | | 3/1989 | Kasugai et al. |
| 4,878,511 A | | 11/1989 | Fox |
| 4,905,726 A | | 3/1990 | Kasugai et al. |
| 4,982,757 A | | 1/1991 | Ohasi et al. |
| 5,028,244 A | * | 7/1991 | Szlaga ......................... 137/202 |
| 5,044,389 A | | 9/1991 | Gimby |
| 5,090,459 A | | 2/1992 | Aoki et al. |
| 5,183,087 A | | 2/1993 | Aubel et al. |
| 5,215,110 A | | 6/1993 | Benjey |
| 5,265,644 A | | 11/1993 | Tuckey |
| 5,388,611 A | | 2/1995 | Harris |
| 5,402,818 A | | 4/1995 | Kasugai et al. |
| 5,421,306 A | | 6/1995 | Talaski |
| 5,449,018 A | | 9/1995 | Harris |
| 5,449,029 A | | 9/1995 | Harris |

(List continued on next page.)

Primary Examiner—Gerald A. Michalsky
(74) Attorney, Agent, or Firm—Dority & Manning, P.A.

(57) ABSTRACT

A fuel vapor control valve for use in a vehicle fuel system is provided. The control valve has a rollover valve assembly with a valve member defining a point-bearing surface, a housing with an opening, and a chamber. The housing is mountable to a fuel tank. The valve member is movable within the chamber and a sealing element is movably located on the point-bearing surface of the valve member. The sealing element may be metallic and is configured to releasably seal the opening when the valve member is urged in a direction towards the opening.

40 Claims, 7 Drawing Sheets

U.S. PATENT DOCUMENTS

| | | |
|---|---|---|
| 5,462,100 A | 10/1995 | Covert et al. |
| 5,497,800 A | 3/1996 | Ohashi et al. |
| 5,507,318 A | 4/1996 | Israelson |
| 5,518,018 A | 5/1996 | Roetker |
| 5,524,592 A | 6/1996 | Woody et al. |
| 5,524,662 A | 6/1996 | Benjey et al. |
| 5,529,086 A | 6/1996 | Kasugai et al. |
| 5,535,772 A | 7/1996 | Roetker et al. |
| 5,564,466 A | 10/1996 | Aoyama et al. |
| 5,577,526 A | 11/1996 | Kasugai et al. |
| 5,579,802 A | 12/1996 | Tuckey |
| 5,582,198 A | 12/1996 | Nagino et al. |
| 5,598,870 A | 2/1997 | Nagino |
| 5,598,872 A | 2/1997 | Kasugai et al. |
| 5,623,910 A | 4/1997 | Riggle |
| 5,632,296 A | 5/1997 | Kasugai et al. |
| 5,640,989 A * | 6/1997 | Nemoto et al. ............. 137/202 |
| 5,640,993 A | 6/1997 | Kasugai et al. |
| 5,666,989 A | 9/1997 | Roetker |
| 5,669,361 A | 9/1997 | Weissinger et al. |
| 5,678,590 A | 10/1997 | Kasugai et al. |
| 5,687,756 A | 11/1997 | VanNatta et al. |
| 5,687,778 A | 11/1997 | Harris |
| 5,694,968 A | 12/1997 | Devall et al. |
| 5,738,132 A | 4/1998 | Zakai et al. |
| 5,762,090 A | 6/1998 | Halamish et al. |
| 5,842,455 A | 12/1998 | Tuckey et al. |
| 5,937,896 A | 8/1999 | Miyajima et al. |
| 5,975,116 A | 11/1999 | Rosas et al. |
| 6,003,499 A | 12/1999 | Devall et al. |
| 6,035,884 A | 3/2000 | King et al. |
| 6,058,963 A | 5/2000 | Enge et al. |
| 6,170,510 B1 | 1/2001 | King et al. |
| 6,240,950 B1 | 6/2001 | Harris |
| 6,508,263 B1 | 1/2003 | Jahnke et al. |

\* cited by examiner

VAPOR CONTROL VALVE WITH A METALLIC SEALING ELEMENT

FIELD OF INVENTION

The present invention relates to a fuel system valve, and particularly to a valve with a sealing element resistant to deformation for regulating the flow of fuel vapor through a venting outlet.

BACKGROUND OF INVENTION

Vehicle fuel systems are known to include valve assemblies mountable on fuel tanks or in filler necks of the vehicle fuel systems. Such conventional valve assemblies are typically manufactured of plastic materials and may include pressure-relief, over-fill, and/or rollover components. Further, the valve assemblies may include a sealing element made of a plastic, hard rubber, or other elastomeric material.

By way of example, in operation, the typical plastic sealing element presses against a portion of the plastic valve assembly under vapor or fuel pressure, gravity, or the like to seal the valve assembly. Over time, the recurring sealing action and repeated exposure to vehicle vibrations and fuel tank pressures can flatten and wear down edges of the plastic sealing element. Moreover, that portion of the valve assembly, which is contacted and sealed by the sealing element, may deteriorate such as by developing an indentation due to the repeated contact with the sealing element.

Eventual deformation of the plastic sealing element and the contacted portion of the valve assembly adversely affects the sealing capacity of the valve assembly. It will be appreciated, for instance, that impaired sealing can degrade the rollover function of the vehicle fuel system. Specifically, a deformed sealing element in a rollover situation can permit fuel to leak past an outlet of the valve assembly to a fuel vapor recovery canister or directly to the atmosphere external to the vehicle, which may create a fire or explosion hazard.

BRIEF SUMMARY OF INVENTION

According to the present invention, a vehicle fuel vapor control valve is provided for use with a vehicle fuel system. The component parts of the invention are simple, reliable, and economical to manufacture, assemble, and use. Other advantages of the invention will be apparent from the following description and the attached drawings, or can be learned through practice of the invention.

According to an aspect of the invention, a fuel vapor control valve for regulating fuel vapor in a vehicle having a fuel tank and a recovery canister is provided. The fuel vapor control valve has a mounting portion with an inlet in communication with an inside of the fuel tank and an outlet for communicating fuel vapor from the fuel tank to the recovery canister.

The fuel vapor control valve in this aspect includes a rollover assembly, which has a valve housing and a valve member or float. The valve housing is configured for attachment to the mounting portion and has an opening in communication with the inlet of the mounting portion. The float is movable within the valve housing and has a structure and a seal depending from the float in a direction of the mounting portion. A skirt of the seal is retained with limited movement in a retention slot of the structure. Further, the retention slot has a contact surface and the skirt has a complimentary contact surface, which is configured to intermittently contact the contact surface as the seal releasably seals the opening. More specifically, the structure permits the seal to contact an area about the opening to releasably seal the opening when a level of fuel from the fuel tank contacts the float and urges the float in the direction of the mounting portion. Also in this aspect, the seal is made of a metallic material while the valve housing is an plastic material. The foregoing construction prevents deformation of the seal and the valve housing due to repeated contact by the seal against the contact surface when sealing the valve assembly.

According to another aspect of the invention, a rollover valve assembly, in some ways similar to the previous example, has a valve member movable in a chamber of a housing. The valve member in this aspect has a point-bearing surface on which a sealing element is movably located to releasably seal an opening in the housing when the valve member is urged in a direction towards the opening by rising fuel, gravity or the like.

The sealing element in this aspect has an insert (alternatively, receptacle) with a receiving surface, which may be cone-shaped to receive the point-bearing surface. The sealing element defines a substantially flat surface and a skirt disposed apart from the flat surface. The insert is affixed in the sealing element such that the skirt moves with a movement of the insert on the point-bearing surface. Accordingly, the flat surface releasably seals the opening when, for example, the fuel rises to urge the valve member toward the opening while permitting the valve member a limited range of motion about the sealing element when it is sealed against the opening.

Also in this aspect of the invention, the flat surface and the skirt of the sealing element are manufactured of a metallic material and the receptacle is manufactured from a plastic or elastomeric material. However, the flat surface, skirt and the receptacle can be unitarily constructed of metal, which can be stainless steel, aluminum, a non-corrosive alloy or combinations of these or other metals.

In another aspect of the invention, a rollover valve assembly similar to the foregoing embodiments has a housing, which is mountable to a fuel tank. The rollover valve assembly also includes a valve member movable in a chamber of the housing. A metallic sealing element is located on the valve member to releasably seal an opening in the housing in communication with the chamber when the valve member is urged in a direction toward the opening.

Moreover, the housing defines a plastic surface disposed about the opening, and the metallic sealing element defines a substantially flat surface configured to substantially uniformly contact the plastic surface and seal about the opening when the valve member is urged in the direction by a force such as rising fuel, gravity, a spring constant or the like. In this aspect, the flat surface of the metallic sealing element is polished such that it is substantially smooth and flat. This construction provides a flat, hard metal part, which, when contacting the sealing surface repeatedly, provides for a flat sealing surface and a tight seal. More specifically, because the flat metal surface does not deform the plastic sealing surface such as with grooves and indentations, the seal created by the metal sealing element to plastic sealing surface tends to produce a tighter seal than a plastic-to-plastic or metal-to-metal combination.

Another aspect of the invention includes a fuel vapor control valve for a fuel system, which has a fuel tank and a connection portion attached to a fuel vapor recovery canister. This example fuel vapor control valve includes a valve housing configured for attachment to the connection portion and a valve member, similar to the foregoing descriptions, which is axially movable in the valve housing. Further, the valve housing includes a first opening, a second opening and a disc holder or pocket. The first opening communicates with the fuel tank while the second opening communicates with the fuel vapor recovery canister. The disc holder is located between the connection portion and the second opening to hold a vapor restriction device such as a disc, which is movably seated in the disc holder. At least one hole in the disc is configured to permit a restricted passage of fuel vapor substantially at all times when the disc is normally seated in the holder. In some circumstances, the disc holder permits the disc to rise up momentarily to increase fuel vapor flow.

Additional objects, features, and advantages of the invention will become apparent to those skilled in the art upon consideration of the attached drawings in conjunction with the following detailed description of the drawings, which exemplifies the best mode of carrying out the invention as presently perceived, or can be learned through practice of the invention.

BRIEF DESCRIPTION OF THE DRAWINGS

The above and other aspects and advantages of the present invention are apparent from the detailed description below and in combination with the drawings in which.

DETAILED DESCRIPTION OF THE DRAWINGS

Detailed reference will now be made to the drawings in which examples embodying the present invention are shown. Repeat use of reference characters in the present specification and drawings is intended to represent same or analogous features or elements of the invention.

The drawings and the following detailed description provide a full and detailed written description of the invention and the manner and process of making and using it, so as to enable one skilled in the pertinent art to make and use it. The drawings and detailed description also provide the best mode of carrying out the invention. However, the examples set forth herein are provided by way of explanation of the invention and are not meant as limitations of the invention. The present invention thus includes modifications and variations of the following examples as come within the scope of the appended claims and their equivalents.

As broadly embodied in the Figures, a control valve assembly is provided for regulating fuel vapor in a vehicle having a fuel tank and a recovery canister. The control valve assembly 10 includes a connection or mounting portion 12, which is mountable to a fuel tank T. A rollover assembly 14 having a float or valve member 18 movably disposed in a valve housing or float chamber 16 is attached to mounting portion 12. While the Figures illustrate a separate mounting portion 12 and rollover assembly 14 attached to fuel tank T, the valve assembly 10, discussed in greater detail below, may have additional or fewer components, may be a unitary assembly, and may be attached to tank T in a variety of alternative arrangements. Therefore, it should be understood that the following descriptive examples of the invention are not intended to limit the present invention to use only as shown in the Figures.

With more particular reference to the Figures, valve assembly 10 is generally attached to tank T by a mount 70 of mounting portion 12 via welding, rivets, screws, or the like as known in the art. The mounting portion 12 is configured to receive the rollover assembly 14 by guide 30 which, in conjunction with an optional o-ring 28, forms a substantially airtight seal between mounting portion 12 and rollover assembly 14. It should be understood, however, that o-ring 28 and guide 30 are not required by the invention and other alternative snap-fit or interference-fit arrangements or adhesives may be used, such as the alternative mounting arrangement of FIG. 5, addressed below.

Generally, the mounting portion 12 shown in FIGS. 1–4 includes a chamber 40, which communicates with an opening 34 of rollover assembly 14. Chamber 40 also communicates via a passageway 42 and a nozzle 44 to an outlet 46. Outlet 46 of nozzle 44 may be connected to a fuel vapor recovery device (not shown) to evacuate fuel vapor from the fuel tank T. Also generally, the float 18 of rollover assembly 14 includes a sealing component or seal 52, which is described in detail below.

Figure 1:
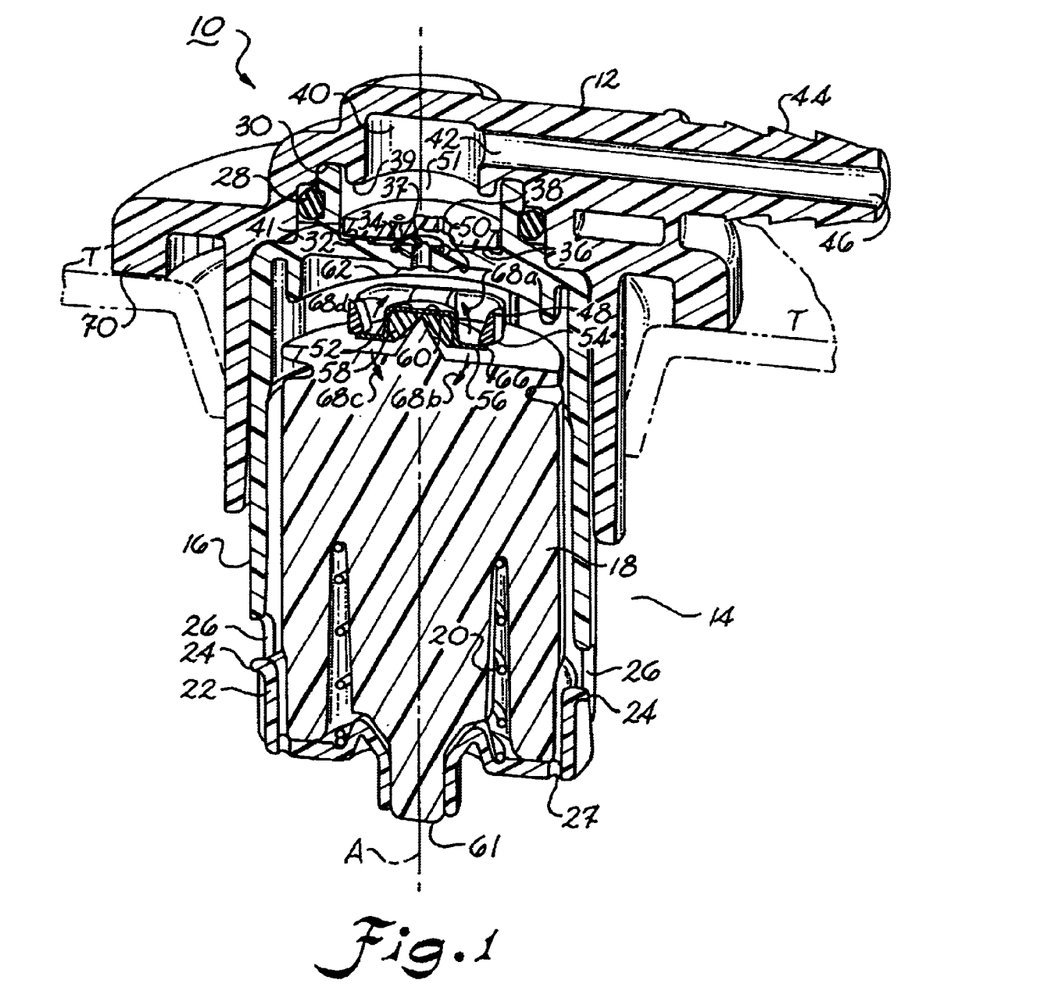
FIG. 1 is a perspective sectional view of one embodiment of a valve assembly according to the present invention.

According to one embodiment of the invention as shown in FIG. 1, float 18 is operably held by a retainer 22 in the valve housing 16. Retainer 22 is mounted by mounting tabs 24 to valve housing 16 through slots 26 to retain the float 18 within the housing 16. As will be discussed below, slots 26 also permit fuel (not shown) and fuel vapor to enter valve housing 16 to act upon float 18 and/or to allow fuel vapor to discharge through nozzle 44. It should be noted that valve housing 16 and retainer 22 need not be separately constructed, nor are the number and shape of slots 26 limited to the illustrations. For instance, the location of the tabs 24 and slots 26 could be reversed. Also, valve housing 16 and retainer 22 could be unitarily constructed with a plurality of slots or apertures of varying sizes and shapes to permit fuel and vapor entry into valve assembly 10.

With further reference to FIG. 1, the float 18 defines a point, a needle, or a pivot 60 and an opposing end 61 through which an axis A of the valve assembly 10 extends. An insert 58 is located between a seal 52 and the pivot 60 upon which the insert 58 is movably disposed. The seal 52 and insert 58 are movably retained proximate the pivot 60 by a structure or collar 48. Specifically, seal 52 defines a skirt 56 that extends through one or more slots 54 of collar 48 to retain the seal 52. Skirt 56 defines a skirt contact 66, which intermittently contacts a contact surface 64 of collar 48 to hold the seal 52 in collar 48. In use, seal 52 is pivotably movable relative to the float 18 and slots 54 in various directions, for example, as indicated by pivot arrows 68a–d.

Figure 4:
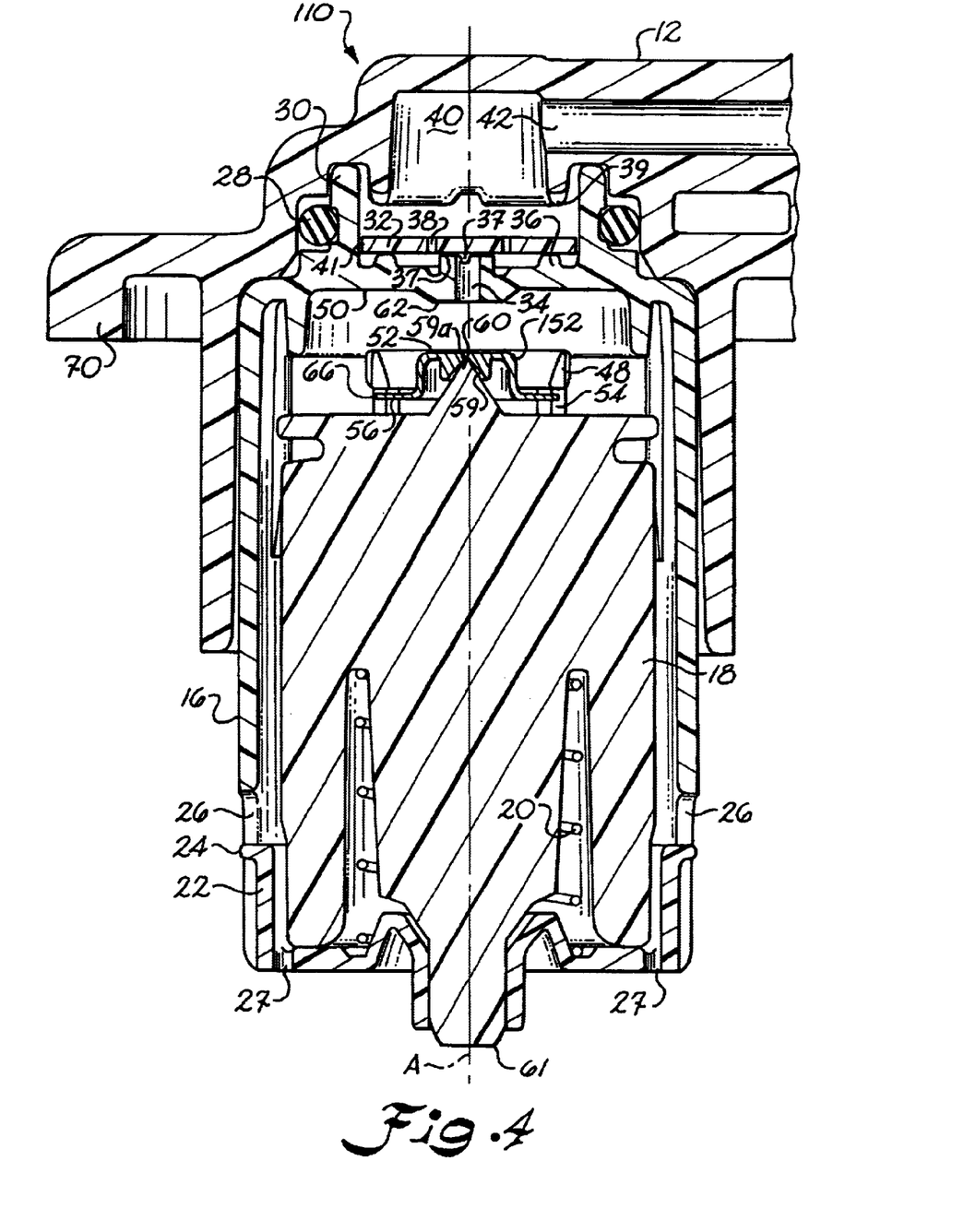
FIG. 4 is a partial sectional side view of another embodiment according to the present invention particularly showing an alternative seal.
Figure 5:
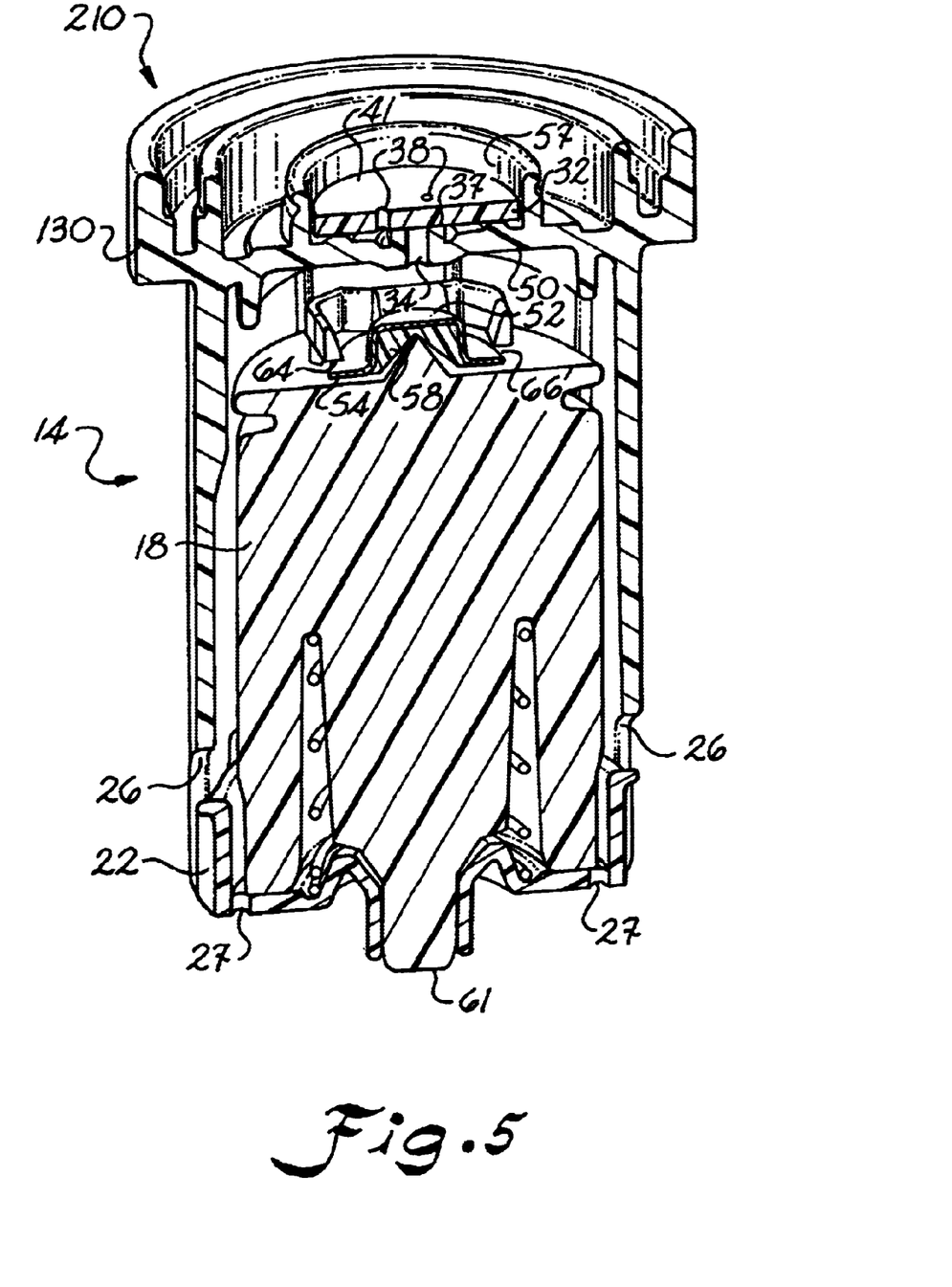
FIG. 5 is a sectional perspective view of another embodiment according to the invention showing an alternative mounting guide.

As seen in FIGS. 1, 4, and 5, rising fuel may contact the optional opposing end 61 of the float 18 to urge float 18 upwardly towards opening 34. Alternatively, or additionally, fuel may enter through at least one aperture 27 as well as through slots 26 to act upon float 18. It is to be understood the shape and position of opposing end 61 and that the shape, number and placement of slots 26 and aperture(s) 27 are merely for illustration and may be modified without detracting from the invention.

Figure 2A:
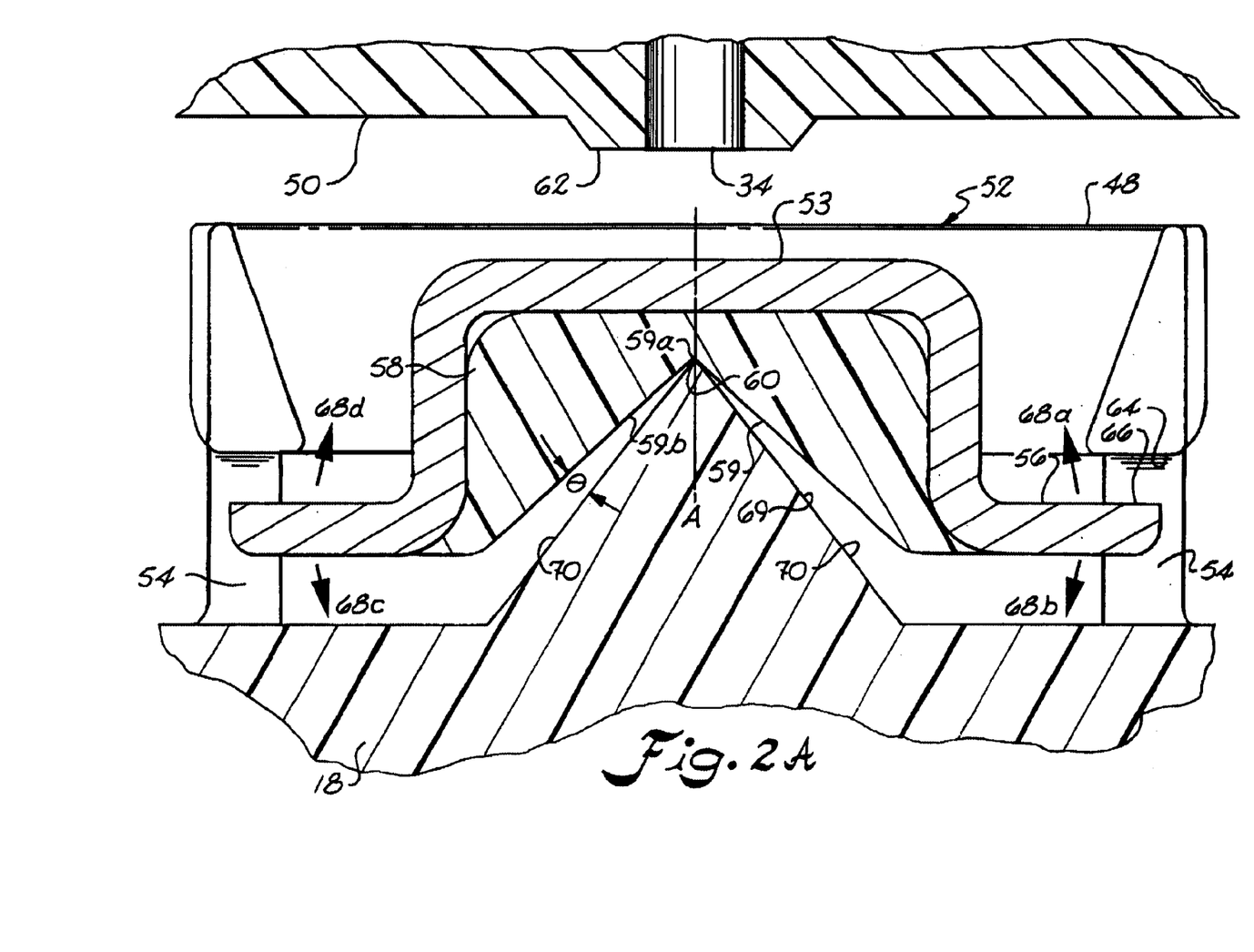
FIG. 2a is a partial, sectional side view of the embodiment of FIG. 1 particularly showing an insert with a seal and a float in a static condition according to the invention.
Figure 2B:
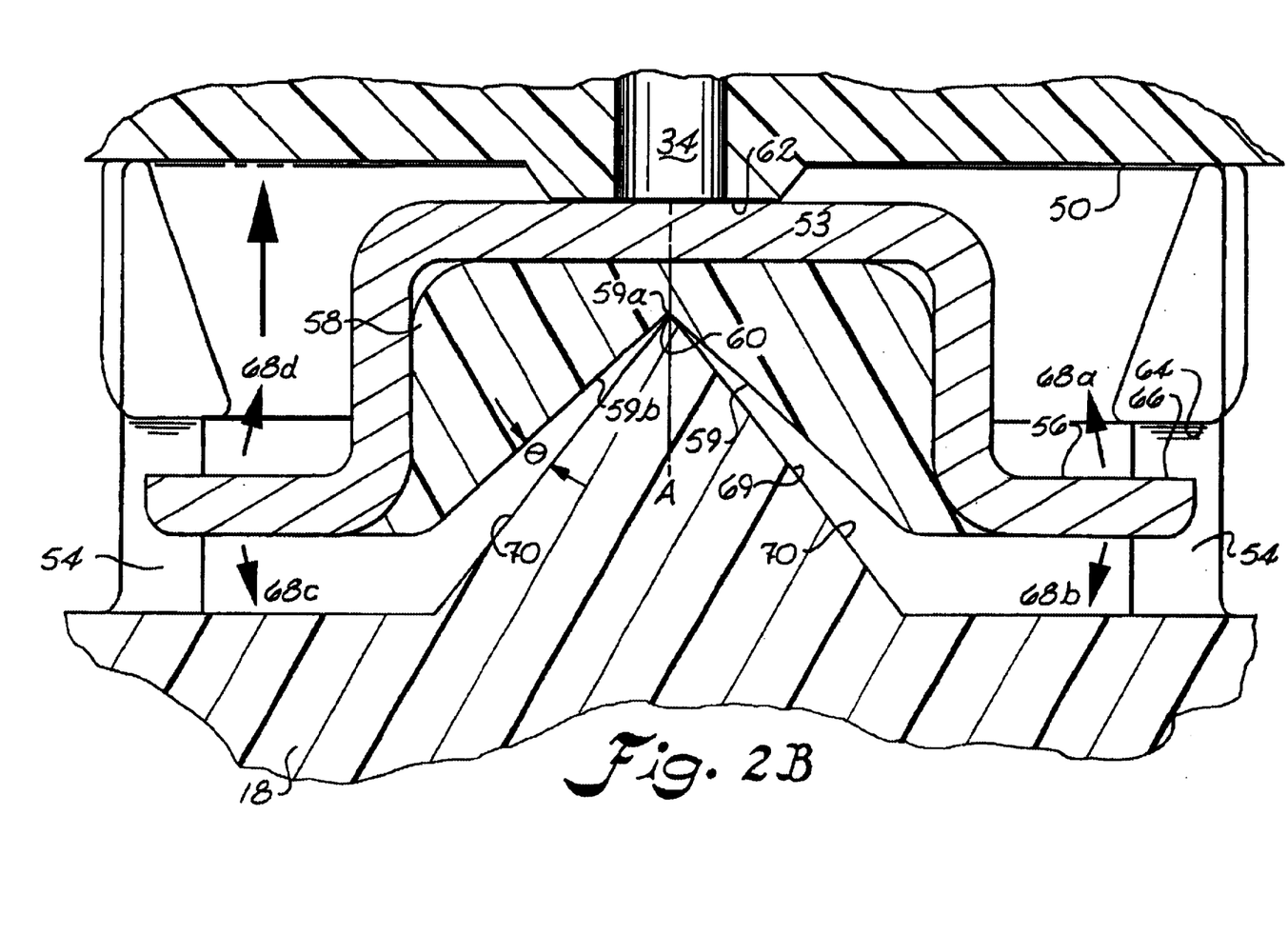
FIG. 2b illustrates the example of FIG. 2a in which fuel, gravity or the like has urged the seal and a collar of the float toward a sealed condition.
Figure 2C:
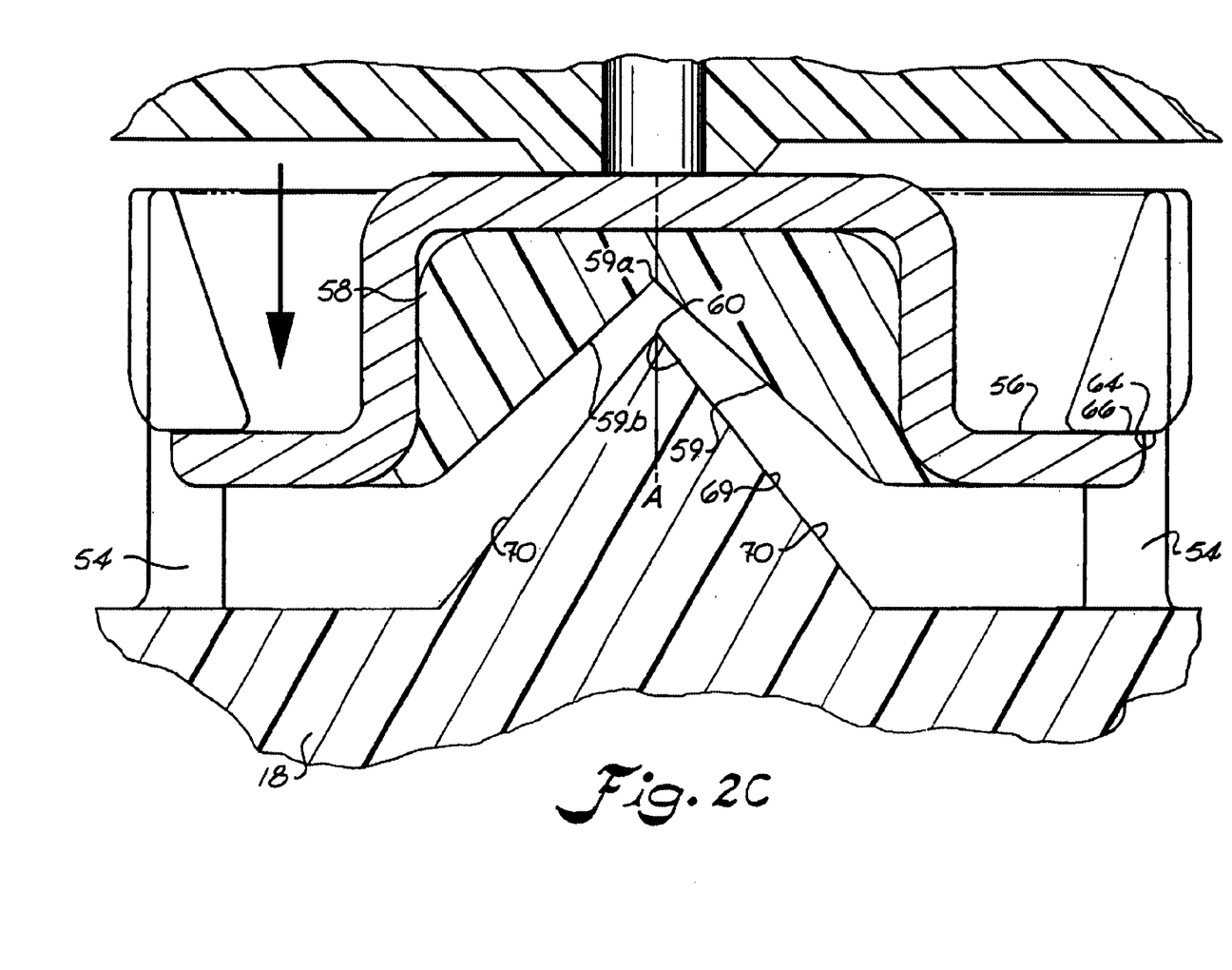
FIG. 2c illustrates another condition in which the collar of FIG. 2b is receded from a perimeter of a valve housing and disposed on a skirt of the seal while the seal remains in the sealed condition.

FIGS. 2a–c show valve assembly 10 under typical conditions. Specifically, float 18 is shown interacting with seal 52 and perimeter 50 of valve housing 16 and insert 58 is shown with a receiving surface 59, which receives the needle or pivot 60 at vertex 59a.

FIG. 2a shows a typical "open" condition in which the valve assembly 10 is static or stationary. As shown, receiving surface 59 and pivot 60 define an angle θ along a given plane. In the open condition, flat surface 53 of sealing element 52 is disposed apart from opening 34. Also shown collar 48 of float 18 is disposed apart from perimeter 50. Also shown in the open condition of FIG. 2a, contact surface 64 and skirt contact 66 are spaced apart substantially horizontally parallel to one another. Moreover, receiving surface 59 of insert 58 and surface 70 of float 18 diverge from one another from vertex 59a generally downwardly in a direction toward slot 26 such that angle θ is substantially uniform between receiving surface 59 and surface 70 about any point between insert 58 and surface 70.

FIG. 2b shows in a typical "closed" condition that angle θ can vary between the receiving surface 59 and pivot 60 as float 18 moves upwardly due to interaction with fuel or as seal 52 is releasably sealed about opening 34. As seen in FIG. 2b, sealing surface 53 is sealed against and substantially horizontally parallel with closing surface 62. In the condition shown in FIG. 2b, the surface 70 of pivot 60 is capable of moving toward and away from the receiving surface 59 as the float 18 moves due to vehicle movement or fuel movement. However, due to the center of gravity of the float 18, angle θ is substantially always an angle greater than zero such that float 18 does not seal only to one side of the pivot 60, e.g., in which angle θ approaches and remains at zero degrees while angle $\theta_2$ remains at some angle greater than zero degrees for an indefinite period. Stated alternatively the pivot 60 pivots about vertex 59a of insert 58 when the vehicle is normally upright.

FIG. 2c shows a sealing condition in which the flat sealing surface 53 remains at least momentarily attracted about opening 34 due to a vacuum condition, overpressure within the fuel tank, or the like. In this instance, fuel is receded from contact with float 18 from the cessation of sloshing due to filling the tank, depletion of the fuel, or the return of the vehicle to an upright position from a rollover condition. By way of example, collar 48 in FIG. 2c has separated from perimeter 50 of the valve housing 16 once fuel has receded from float 18. The contact surface 64 of collar 48, therefore, comes to rest on skirt contact 66 of the seal 52. After a predetermined time as a function of a set weight of float 18 and pressure bleed back through opening 34 and passage P between flat surface 53 and closing surface 62, float 18 via contact surface 64 pulls skirt contact 66 downwardly thus pulling seal 52 away from opening 34 and opening valve assembly 10.

Figure 3:
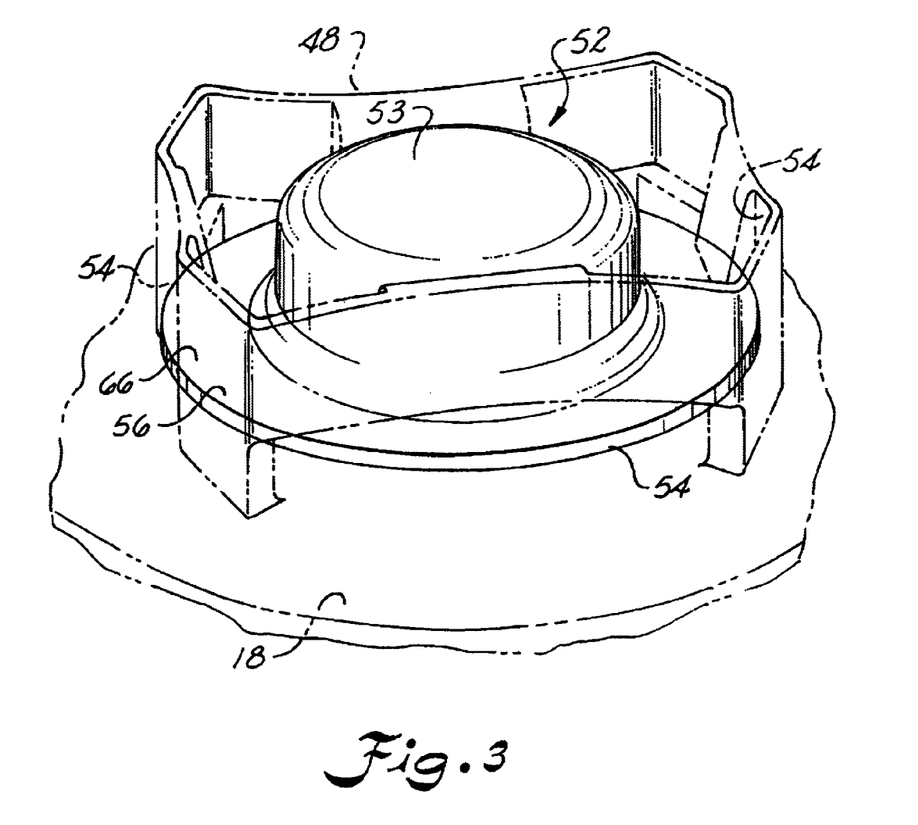
FIG. 3 is a top perspective view of the seal as shown in FIG. 1.

FIG. 3 particularly illustrates the sealing surface 53 of seal 52, which in this example is a flat, metallic sealing surface. The inventors have found that a metal seal such as seal 52 avoids contact and frictional deformations. For example, elastomeric sealing edges of an elastomeric seal, when sealingly disposed against a plastic sealing area, tend to wear down. Additionally, the elastomeric sealing area becomes deformed by the repeated wear contact of the plastic sealing edges. Thus, the seal 52 is constructed of a metal such as a stainless steel and defines the flat surface 53, which prevents an undesirable groove in a complementary, substantially flat closing surface 62 when seal 52 is attracted to opening 34 by a pressure difference like vacuum or overpressure.

As suggested, the inherent durability of metal relative to elastomeric materials has been found to permit the surface 53 to withstand repeated sealing actions while the complementary surfaces 53 and 62 do not wear against each other as much as sharper-edged and/or plastic components might. Thus, the durability and overall life of the inventive sealing system is generally increased with correspondingly fewer maintenance requirements.

FIG. 3 further illustrates the seal 52 in its entirety as seal 52 might be arranged in the collar 48 (shown in phantom) as described above. It should be understood that seal 52 need not have a circular or cylindrical shape as shown in FIG. 3, nor does collar 48 require four slots 54 as illustrated. Slots 54 and skirt 56 may alternately have complimentary shapes, ridges, projections, etc. within the scope of the invention. For example, skirt 56 may be star-shaped with a multitude of points emanating from the star-shape, the points projecting through a plurality of slots other than as shown in FIG. 3.

As seen in FIGS. 1, 4, and 5, valve assembly 10 may include a vapor restriction device or disc 32, which includes one or more holes 38. In general, disc 32 rests above an opening 34 and within a pocket 51 of valve housing 16 as seen, for example, in FIG. 4. The pocket 51 has a raised portion or plurality of bumps 36 upon which the sealing disc 32 is seated. A gap 41, discussed in greater detail below, is defined by fitting the diametrically smaller disc 32 into the diametrically larger pocket 51.

Due to the size, shape, and weight of the optional sealing disc 32, disc 32 is intended to remain seated on bumps 36 substantially at all times until a set vapor pressure unseats disc 32. For instance, while the vehicle is being driven, the substantially flat, coin-shaped disc 32 generally remains seated on bumps 36 until a set pressure is exceeded. For certain applications, this pressure may be approximately 4 kilopascals (4 kPa or 16 inches of water). Therefore, under normal driving conditions (exhibiting a fuel tank pressure of less than 4 kPa or as set by manufacturer requirements), disc 32 will generally not lift above opening 34. It should be noted, however, that due to the dynamics created under certain extreme or abnormal driving conditions, e.g., driving on an unimproved road, the disc 32 may lift up at some pressure lower than 4 kPa momentarily. Disc 32 is thus considered to be sealed during normal driving use, rather than freely vented. Otherwise, disc 32 is configured to remain seated and sealed above opening 34 on bumps 36 during normal vehicle operation as seen in FIG. 4.

In a refueling situation, disc 32 also generally remains seated on bumps 36 such that only a vapor bleed occurs. This bleed is accomplished via a notch 37 in communication with opening 34 and holes 38 to chamber 40 as shown in FIGS. 4 and 5. Furthermore, if a vacuum condition develops in the fuel tank T, notch 37 permits a small amount of vapor draw through holes 38 of disc 32. For example, the fuel tank T can draw ambient air from an outside atmosphere through notch 37 to prevent vacuum deformation of tank T.

By way of further example of an operation of disc 32, increased temperatures tend to increase fuel vapor pressure in the fuel tank T as the heated fuel evaporates in the tank T. Thus, increased fuel vapor venting is necessary to prevent expansion deformation of the fuel tank T. Specifically, in hot weather when reaching and exceeding 4 kPa due to evaporation of fuel in the tank T, the disc 32 may be "blown open." In this fuel vapor expansion condition, disc 32 will contact disc stop 39 to permit the fuel vapor to flow more rapidly through holes 38 and the gap 41 such that fuel vapor enters passageway 42 and exits through outlet 46 via nozzle 44 to relieve vapor pressure in the fuel tank T. Notably, although gap 41 provides an additional vapor passage, gap 41 is configured primarily to prevent "corking" of disc 32 against disc stop 39 particularly when disc 32, wet by fuel, is blown against stop 39 under high temperature/pressure as described above.

FIG. 4 further illustrates an alternative aspect of the present invention (valve assembly 110) in which seal 152 and its receiving surface 59 are unitarily constructed of metal. In this alternative arrangement, pivot 60 operably engages the metal point bearing surface 59 at the vertex 59a substantially in line with the axis A as described in the previous embodiment. The unitary metallic construction of seal 152 may be desirable to simplify the manufacture of valve assembly 110 to reduce costs; i.e., the single metal seal 152 does not require separately manufacturing the plastic insert 58 as shown in FIG. 2, for example. The seal 152 operates substantially the same as separate seal 52 and insert 58 of the previous embodiment.

FIG. 5 illustrates another aspect of the invention in which the valve assembly 210 is similar in construction to valve assemblies 10 and 110 of FIGS. 1–4, but includes an alternate flange mount guide 130 to attach the assembly 210 to a fuel tank flange (not shown by a welding process or by snap-fitting/clipping, for instance. Other aspects and advantages of the FIG. 5 embodiment are substantially similar to the foregoing embodiments and further detail need not be given to appreciate this aspect of the invention.

By way of example operation of the invention with reference to the first embodiment, to assemble and use valve assembly 10, the float 18 is inserted into the valve housing 16 and retained therein by retainer 22. The disc 32 is deposited in the pocket 51 of valve housing 16 and the o-ring 28 is disposed about the guide 30. Guide 30 is then inserted into the connection 12 by snap-fit or similar fashion as previously discussed. The entire valve assembly 10 is then attached to the fuel tank T by welding, riveting, or other device as known in the art.

The float 18 moves in valve housing 16 by fuel, fuel pressure, vehicle motion including rollover, or the like. In a resting or static condition as seen in FIG. 2a, float 18, the collar 48, and seal 52 are movably held in the housing 16. Float 18 is configured to approach the vapor path or opening 34, for instance, as an operator is fueling the fuel tank T, discussed in further detail below.

In one aspect of the invention, the float 18 is heavier than fuel. Therefore, a spring 20, as seen in FIGS. 1, 4 and 5, is inserted in float 18 to urge float 18 in a direction towards vapor path 34 to close the valve assembly 10 when fuel acts upon the float 18. By way of example, as the operator fills the tank T, fuel rises to contact the opposing end 61 of the float 18 and/or enter slots 26 and apertures 27. As seen in a buoyed or closed condition in FIG. 2b, the combination of the rising fuel and urging of spring 20 eventually acts on float 18 to overcome the pre-set weight of the float 18 to buoy float 18 with seal 52 toward opening 34. Upon contact of collar 48 about perimeter 50 in this buoyed condition, seal 52 at least momentarily closes opening 34 due to vacuum, overpressure or the like.

It should be noted that the float 18 and seal 52 can also close opening 34 when the vehicle fuel tank T is inclined beyond a pre-set inclination angle greater than, for example, 60°. Such an angle might occur if the vehicle rolls over or is on a grade or hill. In these cases, the angle would cause fuel to contact float 18 and drive float 18 in the direction of opening 34 as described.

An intermediate condition is shown in FIG. 2c in which the collar 48 drops away from the perimeter 50 once the fuel has settled or receded; the vehicle is moved from an excessive inclination angle; or as fuel is used by the vehicle. Once the fuel and/or angle is no longer acting on float 18, the pre-set weight of the float 18 overcomes the urging of spring 20 and any pressure force in the direction of opening 34 as previously described above. More particularly, as FIG. 2c shows, the resting weight of float 18 via contact surface 64 upon skirt contact 66 eventually overcomes the pressure force acting on surface 53 via opening 34. Seal 52 is then subsequently released from about the opening 34 to open the valve assembly 10 to return the assembly 10 to the resting condition of FIG. 2a.

While exemplary embodiments of the invention have been shown and described, those skilled in the art will recognize that other changes and modifications may be made to the foregoing examples without departing from the scope and spirit of the invention. For instance, specific shapes of various elements of the illustrated embodiments may be altered to suit particular applications. It is intended to claim all such changes and modifications as fall within the scope of the appended claims and their equivalents.

That which is claimed is:

1. A control valve for regulating fuel vapor in a vehicle having a fuel tank and a recovery canister, the control valve comprising:

a mounting portion having an inlet for communicating with an inside of the fuel tank and an outlet for communicating the fuel vapor from the fuel tank to the recovery canister; and a rollover assembly including a valve housing and a float, the valve housing configured for attachment to the mounting portion and having an opening therethrough in communication with the inlet of the mounting portion, the float movable within the valve housing and having a structure and a seal depending from the float in a direction of the mounting portion, the structure having a retention slot therethrough and disposed proximate the seal, the seal defining a skirt configured for movable retention in the retention slot and having an insert substantially free-floating on a pivot of the float, the seal contacting an area about the opening and the structure releasably sealing the opening when a level of fuel from the fuel tank contacts the float and urges the float in the direction of the mounting portion.

2. The control valve of claim 1, wherein the structure is disposed concentrically about the seal.

3. The control valve of claim 1, wherein the retention slot has a contact surface and the skirt has a complimentary contact surface, the complimentary contact surface configured to periodically contact the contact surface when the seal releasably seals the opening.

4. The control valve of claim 1, wherein the seal is a metallic material and the valve housing is a plastic material.

5. The control valve of claim 1, wherein the insert substantially form-fits within the seal and is a plastic material.

6. The control valve of claim 1, wherein the seal and the insert are unitarily constructed.

7. The control valve of claim 6, wherein the unitarily constructed seal and insert are a metallic material.

8. The control valve of claim 1, wherein the float is replaceable through an aperture of the valve housing and further comprising a retainer configured for releasable attachment to the valve housing to substantially close the aperture and retain the float in the valve housing.

9. A rollover valve assembly for use in a vehicle fuel system, the rollover valve assembly comprising:
   a housing configured to be mounted to a fuel tank, the housing having an opening therethrough, a sealing surface disposed about the opening, and a chamber;
   a valve member movable in the chamber and defining a point-bearing surface; and
   a sealing element having a substantially flat surface, the sealing element configured to be substantially harder than the sealing surface and movably located on the point-bearing surface, the flat surface configured to contact the sealing surface to releasably seal the opening when the valve member is urged in a direction towards the opening.

10. The rollover valve assembly of claim 9, wherein the sealing element has a receptacle with a receiving surface to receive the point-bearing surface.

11. The rollover valve assembly of claim 10, wherein the receiving surface is cone shaped.

12. The rollover valve assembly of claim 10, wherein the sealing element defines a skirt disposed apart from the flat surface, the flat surface configured to releasably seal the opening.

13. The rollover valve assembly of claim 12, wherein the flat surface is a metallic material and the receptacle is a plastic material, the metallic and plastic materials affixed to each other such that the skirt moves together with a movement of the receptacle on the point-bearing surface.

14. The rollover valve assembly of claim 12, further comprising a structure disposed about the sealing element, the structure having a slot therethrough for receipt of the skirt such that the skirt restrictively floats in the slot, the structure engageable about the opening and the slot and skirt cooperable to permit the valve member to move in the fuel and to permit the structure to disengage from about the opening before the sealing element disengages from the opening.

15. The rollover valve assembly of claim 10, wherein the flat surface and the receptacle are unitarily constructed of metal.

16. The rollover valve assembly of claim 15, wherein the metal is selected from the group consisting of a stainless steel, an aluminum, a non-corrosive alloy and combinations thereof.

17. The rollover valve assembly of claim 9, further comprising a spring element disposed in the valve member, the spring element configured to urge the valve member in the direction towards the opening by one of a rising fuel or gravity.

18. The rollover valve assembly of claim 9, further comprising a flange-mount guide for mounting on a fuel tank flange.

19. A fuel vapor control valve for a fuel system, the fuel system including a fuel tank and a connection portion attached to a fuel vapor recovery canister, the fuel vapor control valve comprising:
   a valve housing configured for attachment to the connection portion, the valve housing having a first opening therethrough, a second opening therethrough and a disc holder, the first opening in communication with the fuel tank, the second opening in communication with the fuel vapor recovery canister, the disc holder interposed between the connection portion and the second opening;
   a disc movably seated in the disc holder, the disc having a hole therethrough and configured to permit a first restricted passage of fuel vapor; and
   a valve member axially movable in the valve housing, the valve member having a sealing element and a conical point-bearing surface, the sealing element defining a cone-shaped receiving surface to receive the point-bearing surface, the sealing element point balanced on the point-bearing surface such that the receiving surface is movably disposed about the point-bearing surface, the sealing element engageable with the second opening for releasably closing the second opening when the valve member is urged in a direction towards the second opening by a rising fuel.

20. The fuel vapor control valve of claim 19, wherein the sealing element defines a substantially flat surface for releasably closing the second opening, the flat surface having a skirt disposed radially and axially apart from the flat surface.

21. The fuel vapor control valve of claim 20, wherein the point-bearing surface depends from the valve member in a direction of the second opening and further comprising a closing element disposed about the point-bearing surface, the closing element engageable about the second opening and defining a slot therethrough for receipt of the skirt, the skirt axially and radially movable in the slot, the slot and skirt cooperable to permit the valve member to move independent of the sealing element when the sealing element engages the second opening, the closing element operable to disengage from about the engaged sealing element before the sealing element disengages from the second opening.

22. The fuel vapor control valve of claim 19, wherein the disc is substantially coin-shaped.

23. The fuel vapor control valve of claim 19, wherein the hole is a plurality of holes, the plurality of holes disposed radially apart from the second opening.

24. The fuel vapor control valve of claim 19, wherein the disc holder defines at least one raised portion with a notch, the disc configured to seat substantially constantly on the at least one raised portion to permit the first restricted passage of fuel vapor through the notch, the disc operable to momentarily unseat from the at least one raised portion to permit a second restricted passage of fuel vapor.

25. The fuel vapor control valve of claim 24, wherein the mounting portion defines a disc stop disposed substantially opposite the at least one raised portion, the disc stop configured to stop an axial movement of the disc when the disc is operating to permit the second restricted passage of fuel vapor.

26. The fuel vapor control valve of claim 19, wherein the disc is diametrically smaller than the disc holder to permit a third substantially constant restricted passage of fuel vapor at a point between the disc and the disc holder.

27. The fuel vapor control valve of claim 19, further comprising attachment means for attaching the valve housing to the connection portion, the connection portion configured to matingly receive the attachment means.

28. The fuel vapor control valve of claim 27, wherein the attachment means includes an O-ring configured to be compressibly disposed between the attachment means and the connection portion, the O-ring operable to at least partially seal the valve housing together with the connection portion.

29. A fuel vapor control valve for a vehicle fuel tank comprising:

a housing configured for attachment to the fuel tank and defining a vapor path therethrough in communication with means for receiving fuel vapor, the housing having a float chamber in communication with the vapor path;

a vapor restriction device movably disposed proximate the vapor path to restrict a vapor bleed from the vapor path substantially constantly; and a float movable in the float chamber, the float having a collar and a seal, the collar configured to loosely hold the seal and further configured to approach the vapor path in a first fuel condition, the seal configured to close the vapor path in a second fuel condition, the collar operable to recede from proximate the vapor path in a third fuel condition, the seal configured to open the vapor path in a fourth fuel condition.

30. The fuel vapor control valve of claim 29, wherein the first fuel condition is selected from the group consisting of fuel contacting the float at a predetermined level during refueling, fuel contacting the float when the vehicle fuel tank is inclined beyond a preset inclination angle, and combinations thereof.

31. The fuel vapor control valve of claim 29, wherein the second fuel condition occurs subsequent to the first fuel condition.

32. The fuel vapor control valve of claim 29, wherein the third fuel condition is selected from the group consisting of fuel receding from the float below a predetermined level, fuel receding from the float when the vehicle fuel tank is substantially level, and combinations thereof.

33. The fuel vapor control valve of claim 29, wherein the fourth fuel condition occurs subsequent to the third fuel condition.

34. A rollover valve assembly for use in a vehicle fuel system, the rollover valve assembly comprising:

a housing configured to be mounted to a fuel tank, the housing having an opening therethrough and a chamber;

a valve member defining a needle disposed thereon, the valve member movable in the chamber; and a metallic sealing element movably located on the needle of the valve member and configured to releasably seal the opening when the valve member is urged in a direction towards the opening.

35. The rollover valve assembly of claim 34, wherein the housing defines a plastic surface disposed about the opening and the metallic sealing element defines a substantially flat surface configured to substantially uniformly contact the plastic surface and seal about the opening when the valve member is urged in the direction by a force, wherein the force is a rising fuel, a gravity, a spring constant, or combinations thereof.

36. The rollover valve assembly of claim 35, wherein the flat surface is polished such that the flat surface is substantially smooth and flat.

37. The rollover valve assembly of claim 34, wherein the metallic sealing element is a metal selected from the group consisting of a stainless steel, an aluminum, a non-corrosive alloy and combinations thereof.

38. The rollover valve assembly of claim 34, wherein the needle is a plastic material and further comprising an insert disposed in the metallic sealing element, the needle operable to seat against the insert.

39. The rollover valve assembly of claim 38, wherein the insert is a plastic material.

40. The rollover valve assembly of claim 38, wherein the insert is an elastomeric material.

* * * * *